(12) United States Patent
Puliga et al.

(10) Patent No.: US 9,174,364 B2
(45) Date of Patent: Nov. 3, 2015

(54) PELLET DOSING APPARATUS

(71) Applicant: ULTRASION, SL, Cerdanyola del Valles (ES)

(72) Inventors: Francesco Puliga, Barcelona (ES); Matias Sacristán Erriquez, Sant Cugat Del Valles (ES); Antoli Plantà Torralba, Sant Hilari Sacalm (ES); Francisco Javier Plantà Torralba, El Masnou (ES)

(73) Assignee: ULTRASION, SL (ES)

( * ) Notice: Subject to any disclaimer, the term of this patent is extended or adjusted under 35 U.S.C. 154(b) by 0 days.

(21) Appl. No.: 14/274,629

(22) Filed: May 9, 2014

(65) Prior Publication Data

US 2014/0249669 A1 Sep. 4, 2014

Related U.S. Application Data

(63) Continuation-in-part of application No. PCT/IB2012/002337, filed on Nov. 13, 2012.

(51) Int. Cl.
| | |
|---|---|
| *G06G 7/00* | (2006.01) |
| *B29C 31/02* | (2006.01) |
| *B29C 31/06* | (2006.01) |
| *B29C 47/00* | (2006.01) |
| *B29C 47/10* | (2006.01) |
| *B29L 30/00* | (2006.01) |
| *B29C 45/18* | (2006.01) |

(52) U.S. Cl.
CPC ............. *B29C 31/02* (2013.01); *B29C 31/06* (2013.01); *B29C 47/0009* (2013.01); *B29C 47/1009* (2013.01); *B29C 45/18* (2013.01); *B29L 2030/00* (2013.01)

(58) Field of Classification Search
USPC .......................................................... 700/230
See application file for complete search history.

(56) References Cited

U.S. PATENT DOCUMENTS

| | | | | |
|---|---|---|---|---|
| 4,991,748 | A | * | 2/1991 | Hackmann et al. ............ 222/361 |
| 5,242,667 | A | * | 9/1993 | Koziol et al. .................. 117/214 |
| 5,997,234 | A | * | 12/1999 | Norris ............................ 414/196 |
| 6,132,157 | A | * | 10/2000 | Comardo ....................... 414/160 |
| 6,877,933 | B2 | | 4/2005 | Ho et al. |
| 6,896,732 | B2 | * | 5/2005 | Fickett et al. .................. 117/208 |
| 8,200,367 | B2 | * | 6/2012 | Foley et al. .................... 700/240 |

FOREIGN PATENT DOCUMENTS

| | | |
|---|---|---|
| CN | 1474189 A | 8/2002 |
| CN | 101148224 | 3/2008 |
| JP | 2010149894 | 7/2010 |

* cited by examiner

*Primary Examiner* — Kyle Logan
(74) *Attorney, Agent, or Firm* — Hess Patent Law Firm LLC; Robert J. Hess

(57) ABSTRACT

The pellet dosing apparatus comprises a hopper (10) pouring pellets (1) on a chute (30) which is vibrated by a vibrator device (3) to move the pellets (1) forward along the chute until dropping them from a discharging end (30*a*). A counting device (20) is arranged for counting the number of pellets (1) falling from said discharging end (30*a*) of the chute (30) into a dosing container (4). The pellets (1) are retained in the dosing container (4) by transferring means until their number reaches an amount corresponding to a pre-established dose determined by control means based on a counting signal received from said counting device (20). The control means then control the transferring means to transfer the pellets from the dosing container to an output duct.

4 Claims, 3 Drawing Sheets

PELLET DOSING APPARATUS

FIELD OF THE ART

The present invention generally relates to a pellet dosing method for a pellet dosing apparatus provided with a counting device which allows counting the number of pellets dosed, a PLC device and several electrical and mechanical systems whereby controlling the amount of pellets in the dose to be supplied to a subsequent process is possible. These pellets, which are generally made of plastic material, can be used in a molding process.

BACKGROUND OF THE INVENTION

There are several inventions related to the dosing of elements. The existing dosing systems have two characteristic elements: on one hand the transporting system for transporting the element to be treated, for example pellets, and on the other hand the control system for controlling the amount of elements. The pellets are at first contained in a hopper or tank. By means of the transporting system they are moved from the hopper to another container where the amount of elements to be used in the molding process is accumulated.

U.S. Pat. No. 6,877,933B2 describes a system for dosing pellets in which the pellets are transported by suction through the generation of vacuum. The pellets are transported towards a hopper where they accumulate. The hopper pours its content when a level sensor determines that it is completely full.

Patent JP 2010149894 proposes a system for dosing pellets having a plate with openings in which the pellets falling by gravity from the hopper are retained. The plate with openings is horizontally displaced under the hopper to favor the introduction of the pellets in the openings. A detection system verifies that the openings contain pellets and the content is finally poured into a second hopper.

Patents CN 1474189 and CN 101148224 disclose dosing systems which use a vibrating element to enable the movement of the pellets. The pellets are contained on a horizontal plate to which the vibration is provided. The pellets circulate randomly on the vibrating plate and at some point of their displacement reach an output opening which leads them to a conveyor belt.

In view of the mentioned background, proposing a system which allows dosing a specific but variable number of elements according to needs is necessary and useful. In the mentioned patents U.S. Pat. No. 6,877,933B2 and JP 2010149894 the number of elements obtained is fixed, because it is determined, in the first case, by the capacity of the hopper, and in the second case, by the number of openings of the plate. Obviously, doses of different amounts could be obtained by exchanging these elements with others of different dimensions or amount of openings but it is more convenient to have variable doses without needing to adapt the machine.

The inventors have verified that causing the movement of the pellets by means of controlled vibrations is a valid option, and that complementing the identification of the pellets by electronic detection means improves the functionality of the dosing apparatus.

In the mentioned patents CN 1474189 and CN 101148224 said vibrating systems work continuously. It would be optimal to control the operation of this device and to only cause the vibration at suitable time and not throughout the entire dosing process.

CN 2734627 discloses a granule counting apparatus which includes all the features of the preamble of claim 1 of the present invention. The detection device of the apparatus of CN 2734627 is depicted in the form of a housing coupled to an end side of a vibratory conveying device, not specifying therein where exactly the granule detection is done, if under the discharging end of the vibratory conveyor or before the granule falls. The type of detection performed is not either indicated in CN 2734627.

CN 201882251 discloses a device for counting and weighing granular objects comprising a detection grating for counting the particles falling from a discharging opening of a vibrating tray. The counting which can be performed with such a detection grating, which has to detect simultaneously a plurality of falling granular objects at once, is not as accurate and simple as it would be with other kind of detection device arrangements acting more locally to detect less, preferably one, granular objects at once.

EP 1332793 A1 discloses a process for dosing and mixing particles, e.g. granules, comprising a transport unit moving some particles to an optical unit where they are counted. Said optical unit has an optical detector arranged to count the particles while being transported by the transport unit, which results in a non-accurate detection of the particles as when some of them are too close to each other, a group of such close particles can be detected as if there was only one particle crossing in front of the optical detector. Other drawbacks due to said arrangement and location of the optical detector can exist which can generate false or erroneous detections, such as those due to particle clogging or due to the vibrations of the transport unit.

DISCLOSURE OF THE INVENTION

The present invention concerns to a pellet dosing method using a pellet dosing apparatus, said pellet dosing apparatus comprising a base supporting a hopper containing pellets, a chute receiving pellets from said hopper, a vibrator device vibrating said chute to move the pellets forward along the chute until dropping them from a discharging end thereof, a dosing container arranged below said discharging end of the chute for receiving the pellets falling therefrom, transferring means which can change between a retention state, wherein the pellets are retained in said dosing container, and a transferring state, wherein the pellets are transferred from the dosing container to an output duct, a counting device arranged for counting the number of pellets which will fall into said dosing container, a weighing device supporting said dosing container, said weighing device being configured for weighing the pellets contained in the dosing container, and control means connected to said counting device, weighing device and transferring means for changing the transferring means from said retention state to said transferring state when the pellets contained in the dosing container reach an amount corresponding to a pre-established dose.

The pellet dosing method of the present invention comprises the step of determining by means of the control means said amount of pellets corresponding to said pre-established dose based on a weighing signal received from said weighing device in combination with a counting signal received from said counting device.

Preferably, the pellet dosing method further comprises the steps of determining by means of the control means a ratio between a number of pellets and the weight thereof and adapting parameters of the control means to an actual weight of the pellets based on said ratio.

Optionally, the pellet dosing method comprises the additional step of momentarily stopping the operation of the vibrator device (3) by means of the control means for interrupting the dosing when the pellets (1) in the dosing container (4) have reached said amount corresponding to the pre-established dose.

In the pellet dosing apparatus cooperating with the pellet dosing method of the present invention, the counting device is arranged for counting the number of pellets after falling from the discharging end of the chute and before entering into the dosing container, and the counting device comprises means for emitting a light beam to be interrupted by the pellets falling from the discharging end of the chute to the dosing container and means for generating said counting signal every time said light beam is interrupted, the counting device and the chute being arranged relative to each other such that each pellet falling from the discharging end of the chute interrupts the emitted light beam.

The present invention relates to a pellet dosing method for a pellet dosing apparatus intended for dosing pellets made of plastic material, including a counting device. The pellet dosing apparatus includes a base supporting a hopper where are the pellets loaded. In one embodiment, said hopper has a large aperture in the upper part and a small aperture in the lower part. The upper aperture allows introducing the pellets in the hopper whereas the lower aperture pours the pellets on a chute leading the pellets towards a dosing system.

In one embodiment, the chute has a "V" cross-section and its width reduces gradually along its length to enable aligning the pellets until they reach a discharging end. The broadest region of the chute is arranged under the hopper whereas the narrowest region is at the opposite end, which ends at the mentioned discharging end. The chute is placed with a slight inclination to favor the circulation of the pellets. Since said inclination is not sufficient to cause the forward movement of the pellets by gravity towards the discharging end, the mentioned forward movement of the pellets is stimulated by a vibrator device which shakes the chute. In one embodiment, the vibrator device comprises, for example, an electric motor moving an eccentric mass. Preferably, the vibrating movement provided by the vibrator device comprises a back and forth movement in a direction substantially parallel to the longitudinal direction of the chute.

As stated above, when the pellets reach the discharging end of the chute they fall by gravity into a dosing container, and a counting device is arranged for counting the number of pellets falling from said discharging end of the chute into the dosing container, where during their fall the pellets intercept a specific counting system implemented in the form of a light beam emitted by a device. This counting device comprises means for emitting said light beam and means for generating a counting signal every time said light beam is interrupted. The light beam can be, for example, a laser light beam. The counting signal can be, for example, a digital signal, which is sent to control means comprising, for example, a PLC with a memory where the number of falling pellets is recorded.

In any case, the mentioned counting means are such that they allow assuredly counting the pellets, acting as a dosing counter or switch.

At the end of their fall, the pellets are deposited in the mentioned dosing container, which has transferring means associated thereto which as a result of driving means change between a retention state, in which the pellets are retained in said dosing container, and a transferring state, in which the pellets are transferred from the dosing container to an output duct. The control means control the transferring means based on the number of pellets contained in the dosing container determined from the counting signal received from said counting device.

It is possible to supply the amounts of pellets corresponding to a pre-established dose by means of counting the pellets. By assuming that the size of the pellets is regular and known, the pre-established dose can be accurately determined from a corresponding number of pellets.

In one embodiment, the. In this case, the control means control the transferring means based on a weighing signal received from said weighing device in combination with said counting signal received from said counting device. Thus, if the size of the pellets is irregular and/or unknown, the pre-established dose can be accurately determined from the ratio between a number of pellets and the weight thereof, and the control means can adapt their parameters to the actual weight of the pellets. By means of combining the counting and the weighing of the pellets it is possible to supply the amounts of pellets corresponding to the pre-established dose with a high accuracy.

In one embodiment, the control means are further configured for momentarily stopping the operation of the vibrator device when the pellets contained in the dosing container have reached the amount corresponding to the pre-established dose, whereby preventing pellets subsequently falling into the dosing container while the pellets are transferred from the dosing container to the output duct In one embodiment, the mentioned transferring means comprise a gate device installed in an outlet located in a lower end of the dosing container. The gate device comprises a gate driven by an electric motor. In another embodiment, the dosing container is hinged and once the desired amount of pellets is received, an electric motor tips the dosing container and pours the pellets into the output duct.

To start the process described above, an operator introduces the desired number of pellets to form the pre-established dose on a digital screen associated to the control means and he validates the process. At that moment, the vibration device circulating the pellets through the chute is activated. As they fall from the chute to the dosing container the pellets are counted by the counting device. When the counting device reaches the previously introduced amount, the vibration device is stopped and the pre-established dose formed by the pellets contained in the dosing container is transferred to the output duct, which leads it, for example, to a mold.

BRIEF DESCRIPTION OF THE DRAWINGS

The foregoing and other advantages and features will be better understood from the following detailed description of exemplary embodiments with reference to the attached drawings, in which:

FIG. 1A is an enlarged plan view of detail A of FIG. 1;

DETAILED DESCRIPTION OF SEVERAL EMBODIMENTS

Figure 1:
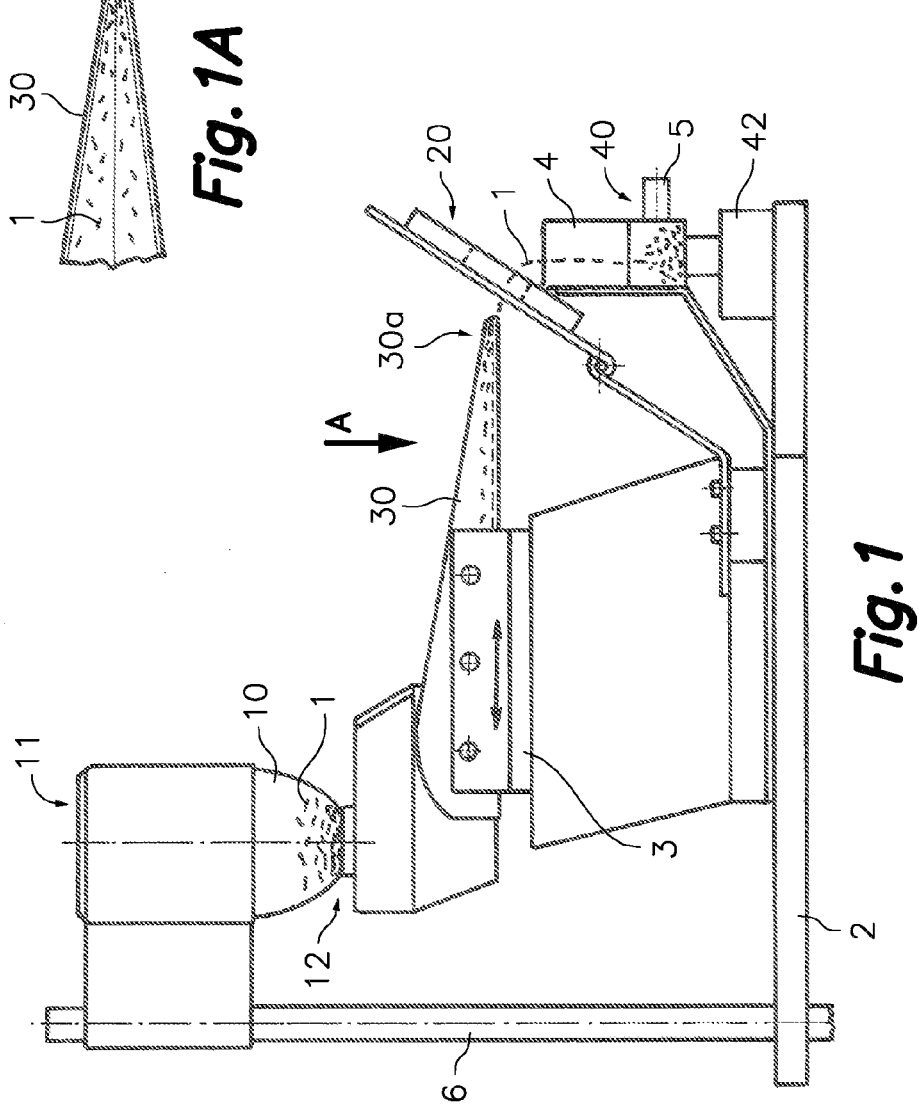
FIG. 1 is a side view of a pellet dosing apparatus cooperating with a pellet dosing method according to an embodiment of the present invention.
Figure 2:
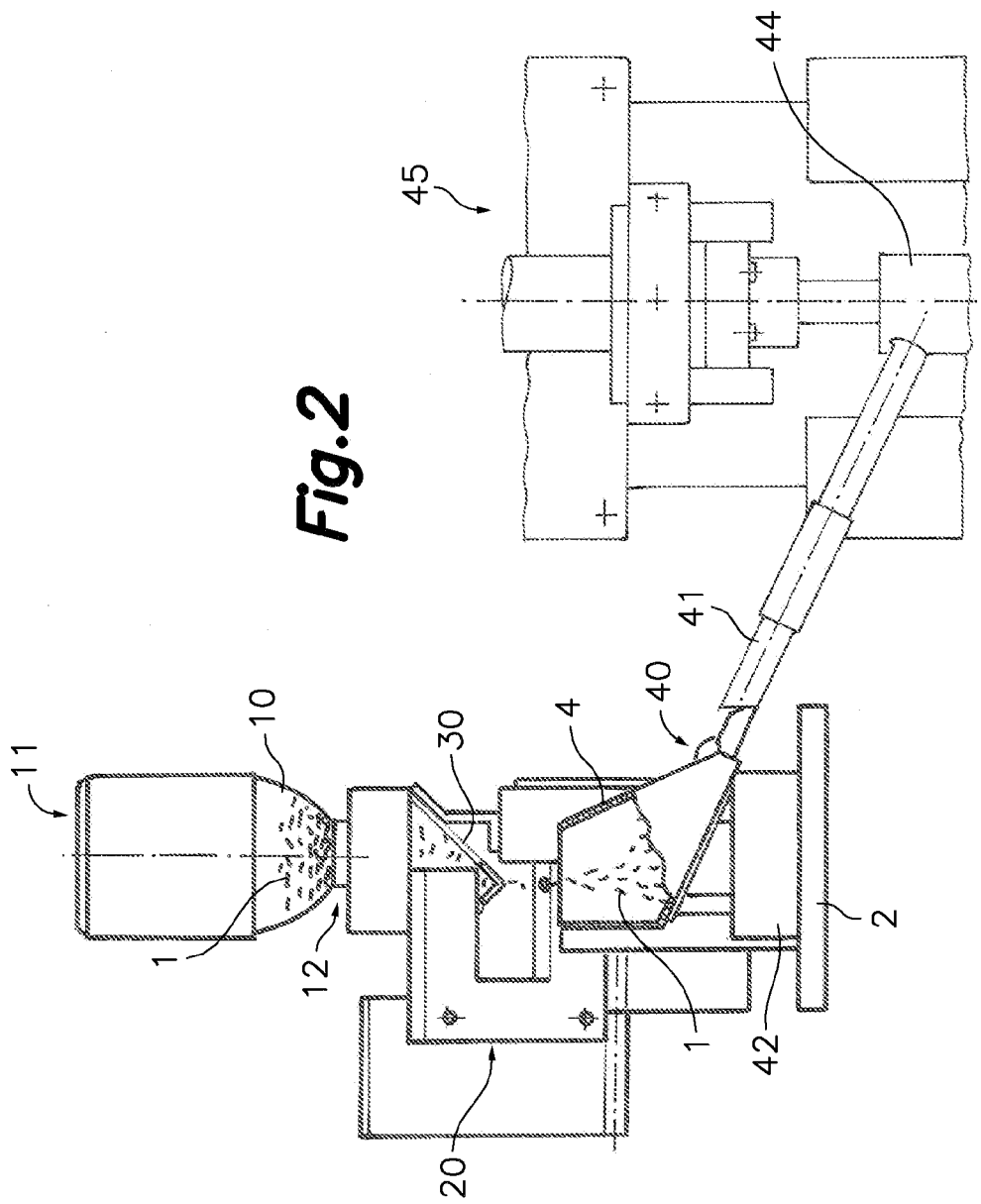
FIG. 2 is a front view of the pellet dosing apparatus.

FIGS. 1 and 2 show a pellet dosing apparatus cooperating with a pellet dosing method according to an embodiment of the present invention, which comprises a hopper 10 fixed to a support element 6 fixed to a base 2. This hopper 10 serves to contain pellets 1 which will later be used, for example, in a molding process performed in a molding machine 45 (FIG. 2) which does not form part of this invention. The hopper 10 has an upper aperture 11 and a lower aperture 12. The upper aperture 11 has greater dimensions than the lower aperture 12, and allows introducing pellets 1 into the hopper 10, whereas the lower aperture 12 allows releasing the pellets 1 by gravity from the hopper 10.

Under the hopper 10 there is arranged a chute 30 receiving the pellets 1 released from the same. The chute 30 has a cross-section according to a specific geometric shape, for example "V" or "U", which has as a main function aligning the pellets before the counting system and falling into the dosing container 4.

The chute 30 which in the embodiment is "V"-shaped has a width reducing gradually along its length from a broadest region located under the hopper 10 to a narrowest region ending in a discharging end 30a, as shown in FIG. 1A.

The chute 30 is supported on the base 2 such that it is slightly inclined with respect to the horizontal. This inclined position facilitates the movement of the pellets 1 along the chute 30 and the mentioned "V" cross-section in combination with the decreasing width of the chute 30 facilitates aligning the pellets 1 as they move towards the discharging end 30a.

The slight inclination of the chute 30 is not sufficient to cause the displacement of the pellets 1 by gravity, therefore the pellet dosing apparatus comprises a vibrator device 3 fixed to the chute 30 and configured for vibrating the chute 30, which causes the circulation of the pellets 1 towards the discharging end 30a. Preferably, the vibrator device 3 is configured for providing a back and forth vibrating movement in a direction substantially parallel to the longitudinal direction of the chute 30, as is indicated by means of a double arrow in FIG. 1. The vibrator device 3 can comprise an electric motor moving an eccentric mass.

When the pellets 1 reach the end of the chute 30 they fall by gravity from the discharging end 30a into a dosing container 4 supported on the base 2. During the fall (see also FIG. 3), the pellets 1 intercept a light beam 21, such as a laser light beam, generated by a counting device 20 supported in a suitable position in base 2. Every time that the light beam 21 is interrupted by a pellet, the counting device 20 generates a counting signal which is sent to control means which can comprise, for example, a PLC with a memory, configured for counting the number of fallen pellets 1. Once passed through the light beam 21 the pellets 1 are finally deposited inside said dosing container 4.

The dosing container 4 is supported on the base 2 by a weighing device 42, configured for weighing the pellets 1 contained in the dosing container 4. The weighing device 42 can comprise, for example, one or more extensometric gauges and generates a weighing signal which is sent to the control means.

Figure 3:
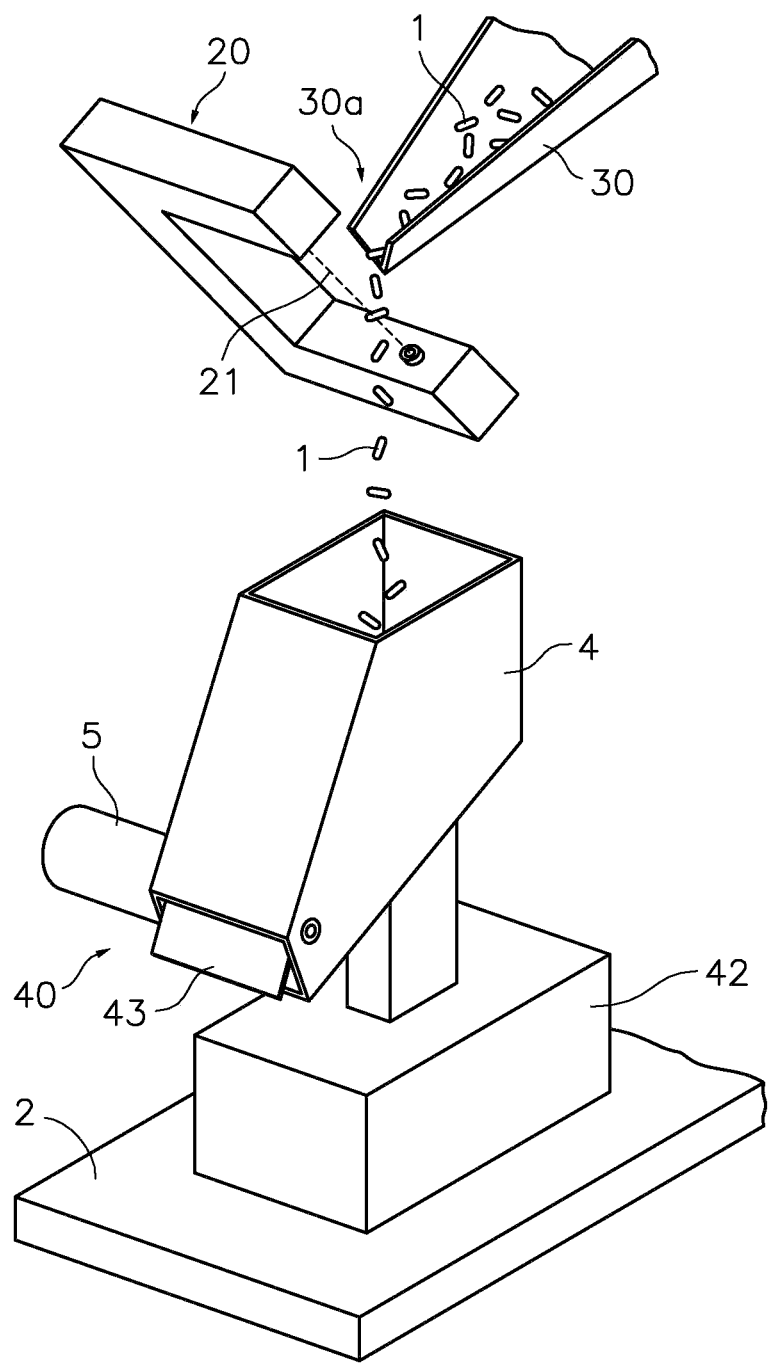
FIG. 3 is a partial perspective view of some of the components of the pellet dosing apparatus.

As is better shown in FIG. 3, at a lower end of the dosing container 4 there is an outlet where transferring means made up of a gate device 40 driven by an electric motor 5 are installed. The gate device 40 comprises a gate 43 moved by said electric motor 5 between a retention position (not shown), in which the pellets 1 are retained by the gate 43 inside the dosing container 4, and a transferring position (FIG. 3), in which the gate 43 allows the pellets 1 to be transferred from the dosing container 4 to an output duct 41 which leads the pellets 1 to, for example, a mold 44 of said molding machine 45 (FIG. 2). In an alternative embodiment (not shown), the dosing container 4 is able to rock and said transferring means comprise an electric motor arranged for tipping the dosing container 4 and thereby pouring the pellets 1 from the dosing container 4 to the output duct 41.

The control means control the electric motor 5 of the gate device 40 to move the gate 43 from the retention position to the transferring position when the pellets 1 contained in the dosing container 4 reach an amount corresponding to a pre-established dose, which is determined by the control means based on the mentioned weighing signal received from said weighing device 42 in combination with said counting signal received from said counting device 20. Furthermore, the control means are configured for momentarily stopping the operation of the vibrator device 3 when the pellets 1 in the dosing container 4 have reached said amount corresponding to a pre-established dose and during the time at which the gate 43 is in the transferring position. Once the gate 43 has returned to the retention position, the counting device 20 is set to zero and the vibration device 3 is again switched on.

The method according to the present invention includes the step of determining by means of the control means said amount of pellets 1 corresponding to said pre-established dose based on a weighing signal received from said weighing device 42 in combination with a counting signal received from said counting device 20.

One additional step of the pellet dosing method comprises determining by means of the control means a ratio between a number of pellets and the weight thereof and adapting parameters of the control means to an actual weight of the pellets based on said ratio.

In one embodiment, the pellet dosing method comprises the additional step of momentarily stopping the operation of the vibrator device 3 by means of the control means for interrupting the dosing when the pellets 1 in the dosing container 4 have reached said amount corresponding to the pre-established dose.

A person skilled in the art will be able to introduce modifications and variations from the embodiment shown and described without departing from the scope of the present invention as defined in the attached claims.

The invention claimed is:

1. A pellet dosing method using a pellet dosing apparatus, said pellet dosing apparatus comprising a base supporting;
   a hopper containing pellets;
   a chute receiving pellets from said hopper;
   a vibrator device vibrating said chute to move the pellets forward along the chute until dropping them from a discharging end thereof;
   a dosing container receiving the pellets from said discharging end of the chute;
   transferring means which can change between a retention state, wherein the pellets are retained in said dosing container, and a transferring state, wherein the pellets are transferred from the dosing container to an output duct;
   a counting device arranged for counting the number of pellets falling from said discharging end of the chute to the dosing container;
   a weighing device supporting the dosing container, said weighing device being configured for weighing the pellets contained in the dosing container; and
   control means connected to said counting device, said weighing device and said transferring means for changing the transferring means from said retention state to said transferring state when the pellets contained in the dosing container reach an amount corresponding to a pre-established dose,
   the method being characterized by the step of determining by means of the control means said amount of pellets corresponding to said pre-established dose based on a weighing signal received from said weighing device in combination with a counting signal received from said counting device.

2. The pellet dosing method according to claim 1, characterized by the steps of determining by means of the control means a ratio between a number of pellets and the weight thereof and adapting parameters of the control means to an actual weight of the pellets based on said ratio.

3. The pellet dosing method according to claim 1, characterized by the step of momentarily stopping the operation of the vibrator device by means of the control means for interrupting the dosing when the pellets in the dosing container have reached said amount corresponding to the pre-established dose.

4. The pellet dosing method according to claim 2, characterized by the step of momentarily stopping the operation of the vibrator device by means of the control means for interrupting the dosing when the pellets in the dosing container have reached said amount corresponding to the pre-established dose.

\* \* \* \* \*